United States Patent [19]

Walsh

[11] 4,384,855

[45] May 24, 1983

[54] EDUCATIONAL TASK RECORDER FOR CHILDREN

[76] Inventor: Belva L. Walsh, 10 W. Oak Park, Centralia, Ill. 62801

[21] Appl. No.: 336,080

[22] Filed: Dec. 31, 1981

[51] Int. Cl.³ .............................................. G09B 1/14
[52] U.S. Cl. ...................................... 434/238; 40/107
[58] Field of Search ............... 434/238, 107, 108, 109; 40/107, 110, 109

[56] References Cited

U.S. PATENT DOCUMENTS

| | | | |
|---|---|---|---|
| 2,414,614 | 1/1947 | Shurick, Sr. | 434/238 |
| 2,564,846 | 8/1951 | Hughes | 40/110 |
| 2,574,899 | 11/1951 | Waring | 40/110 |
| 2,863,603 | 12/1958 | Doupnik | 434/238 X |
| 3,035,355 | 5/1962 | Holmes | 434/238 |
| 3,108,567 | 10/1963 | Seitz | 434/108 X |
| 3,564,731 | 2/1971 | Weller | 434/108 |
| 3,668,789 | 6/1972 | Ferguson | 434/238 X |
| 3,911,606 | 10/1975 | Hunkins | 40/110 |
| 4,028,826 | 6/1977 | Brandifino | 40/110 |
| 4,058,916 | 11/1977 | Whyatt | 40/110 |

Primary Examiner—William H. Grieb
Attorney, Agent, or Firm—Glenn K. Robbins

[57] ABSTRACT

An educational device for recording children's achievements in performing tasks or the like. The device is comprised of a housing having a plurality of horizontal rows of sight openings. Underlying marking strips present in the first opening in each row a pictorial or word designation of the task or achievement while the following openings present a blank markable portion of the strips registered with a series of openings representing different time periods, such as days of the week, and end openings provide a summation portion of the strip. The housing has slots receiving the marking strip registrable with the rows of openings in the housing. The strip is viewed through the housing openings. Additional marking strips are carried in storage slots behind the slideout marking strip. For simplicity in construction and to provide adaptability in size and capacity, the housing is formed in a modular fashion with each row of housing openings and the slots for the slide-out strips being contained in separate modules.

15 Claims, 5 Drawing Figures

EDUCATIONAL TASK RECORDER FOR CHILDREN

BACKGROUND OF THE INVENTION

In the past it has long been a problem to provide children of tender years such as pre-school children who are not yet able to read with a sense of responsibility to perform certain necessary tasks or chores around the house. A further problem resides in the difficulty of recording the tasks that have been done and when done.

Such problems have existed not only for children not yet able to read, but for literate children and even adults. The keeping track of various tasks, chores and other assignments and recording achievements and dates of performance has represented a long felt problem.

SUMMARY OF THE INVENTION

By means of the instant invention there has been provided a simple task, chore or achievement recording device which can be simply employed with a record of the data of performance. The device may be simply employed by visual recognition of the task to be performed by the user with a check area to be filled out for the periods of performance such as the various days of the week. A summation area can be marked at the conclusion of the performance period, such as the end of a week or the like, to indicate the total performance achieved during the period.

The device is simply constructed of a housing which receives one or more task performance strips. Each strip contains at one end a pictorial or worded designation, marking or indicia of the task or achievement to be performed. The strip is adapted to be moved in and out of a slot in the housing behind a row of openings one of which frames the task designation indicia while further openings are in registry with day of the week markings and frame areas of the strip which may be marked as a check off or the like to indicate the task or chore achievement. An opposite end opening in the row frames a portion of the strip which may be marked to indicate a summation or totalling of the task achievements, e.g., weekly summations.

The strip, when provided with a pictorial designation of the task to be performed, such as a tooth brush for brushing the teeth, serves for children not yet able to read as a readily recognizable feature which the child can relate to. The sequential marking in the day of the week openings can then be simply marked off by the child. The device thereby serves not only to provide responsibility in task performance, but as an added educational feature serves as training in the discipline of record keeping at a very early age.

For older children and even adult use the task designation on the strip may be worded such as "Practice Lesson" or the like. Thus, the older users can use any type of task designation strip in the slot of the housing and by daily markings provide an accurate visual record of the weekly performance.

Through the use of a plurality of horizontal rows of openings backed by slots in the housing of the device receiving task designation strips as many different task performance records may be recorded as desired. A slidable pointer may be advanced over the day of the week openings to serve as a date reminder and for the young child aid in day of the week recognition.

The device is simply constructed of a housing which may include a separate module for each horizontal row of openings and slot receiving the task designation strip. The module may be further provided with a storage slot which receives a supply of the strips which may be used to furnish a fresh strip at the start of each week. The modules may be simply connected in vertical alignment such as by a simple tongue and groove connection as desired.

The above features are objects of this invention. Further objects will appear in the detailed description below and will be otherwise apparent to those skilled in the art.

For the purpose of illustration of this invention, a preferred embodiment is shown in the drawing. It will be understood that the drawing is for purpose of example only and that the invention is not limited thereto.

IN THE DRAWING

FIG. 5 is an enlarged view in section taken on the line 5—5 of FIG. 1.

DESCRIPTION OF THE INVENTION

Figure 1:
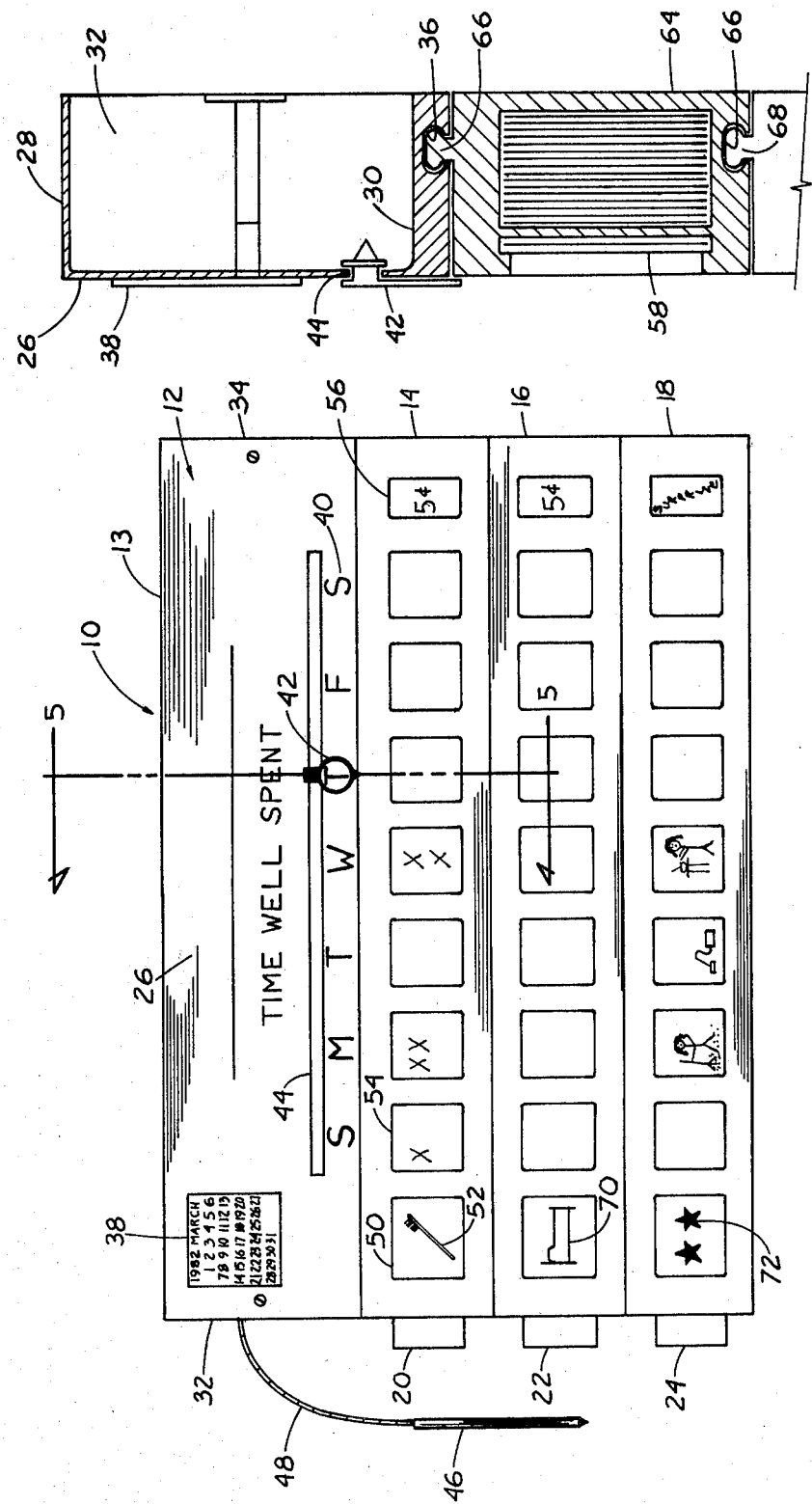
FIG. 1 is a view in front elevation of the task recording device.

The task recording device of this invention is generally indicated by reference numeral 10 in FIG. 1. It is comprised of a housing 12, having a top calendar and day of week indicating portion 13 to which are attached replaceable task achievement modules 14, 16 and 18. Each of the modules support a task indicating strip 20, 22, and 24 respectively, which are framed by a row of openings framing the underlying strip for recording the daily task or chore achieved as will appear more fully herein below.

The top portion of the housing as best appears in FIGS. 1 and 5, is comprised of a hollow box-like structure open at the back and having a front wall 26 bounded by top wall 28, bottom wall 30 and end walls 32 and 34. A slot-like groove 36 is formed in the bottom wall to provide a tongue and groove connection to module 14 as will further appear.

A calendar pad 38 with tear-off monthly sheets is provided at the upper left hand corner. Day of the week letter markings or indicia 40 conforming to Sunday through Saturday are provided in a horizontal row in vertical registry with the intermediate openings in the lower modules to provide for registering or checking off the daily markings of the task performed. A day of the week pointer or indicator 42 is slidably supported in slot 44 of the front wall to indicate the day of the week.

In order to provide ease in marking a pencil or the like is attached by cord 48 to the top portion of the housing. The cord is of a flexible and stretchable construction in order that it may be attached closely to the housing for convenience, yet may be extended for marking the strips at any portion of the modules.

Figure 2:
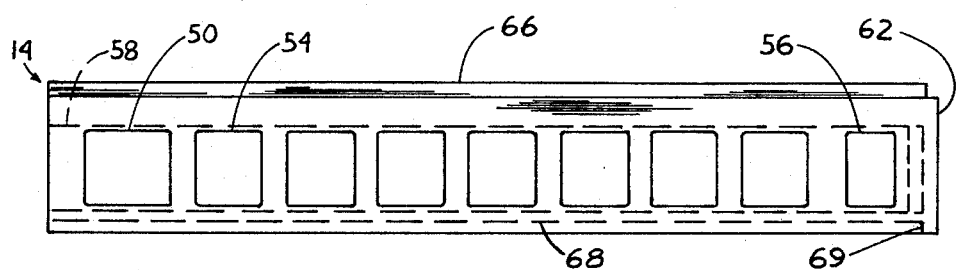
FIG. 2 is a view in front elevation of one of the modules receiving a recording strip.
Figure 3:
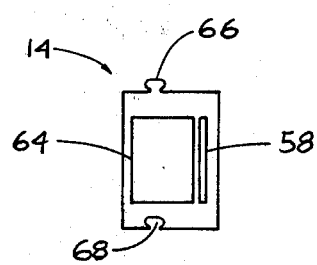
FIG. 3 is a view in elevation of the left end of the module.

The construction of the modules 14, 16 and 18 is best shown in FIGS. 2, 3 and 5. The modules are identical in construction and only module 14 need be described. The module 14 is provided with a row of openings comprised of a first left end opening 50 which is adapted to frame a task designating indicia 52 on the underlying strip 20, a series of seven openings 54 conforming to day of the week openings and a second end opening 56 at the right end of the row of openings serving as a summation of weekly achievement opening.

The module is provided with a narrow rectangular strip receiving slot 58 opening into the left end 60 of the module and extending behind the row of openings in the module to the right end wall 62 which serves as a stop to register and frame the pictorial indicia 52 behind the task designating opening 50.

A similar slot 64 is provided of a greater width to serve as a storage area for additional strips. Fresh strips are used each week or as otherwise needed as the strips are marked.

In order to provide for adaptability in size of the marking recorder the modules may be used in any number as desired. Connection is provided by a top tongue member 66 and a bottom conforming groove member 68 to provide a simple tongue and groove connecting means for connecting the module 14 to the top portion of the housing and the modules to one another as desired. The lower right end 69 of wall 62 serves as a stop.

The marking device when connected together in the fashion shown in FIG. 1, provides for the modules 14, 16 and 18 a vertically registered row of task designating indicia in the first opening 50 of each of the modules. This is represented as shown in FIG. 1 by the toothbrush indicia 52 of strip 20 to remind a child to brush his teeth, the pictorial representation 70 in strip 22 to remind a child to make his bed and a two star designation 72 for strip 24 to represent special achievement. These designations are representative and it will be understood that other pictorial representations may be used as desired.

Figure 4:
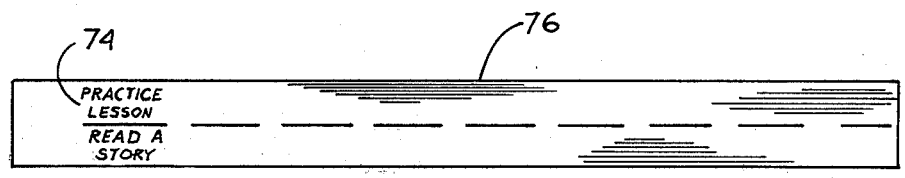
FIG. 4 is a view of a modified recording strip containing a worded task designation.

For older children or adults, a worded task designation indicia 74 may be used as shown in the strip 76 shown in FIG. 4.

The strips employed may be of cardboard, stiff paper or the like as desired and are of a nature that the strip areas presented in the days of the week openings and summation opening may be easily marked. The construction of the top portion of the housing and the modules may be of any standard material of construction such as plastic, wood, sheet metal or the like.

USE

The task recording device of this invention is simply employed by pre-school children not yet able to read and serves not only as an educational device, but also serves as a daily responsibility reminder.

As shown in FIG. 1, the strips 20, 22 and 24, when inserted in the module slots are framed by the row of openings in the module. At the beginning of the week the child moves the day of the week pointer 42 to the first S representing Sunday.

As shown in FIG. 1, the first day of the week opening 54 is marked with the pencil with an X to indicate brushing of the teeth once for that day. As the week progresses, the child moves the day of the week pointer and marks his performance for the end of the day.

For the second strip 22, the child likewise may mark the day of the week openings in a similar fashion to conform to the bed making indicia 22. As shown in this strip, the child has made no markings and can readily see that his responsibility and achievement has been lacking in this area.

The third strip showing the double star pictorial representation 72 may be used by the child to mark in special daily achievements.

The summation tier represented by the last opening 56 in the row of openings is employed to indicate the reward or record of performance at the end of the week for the task represented by the particular strip.

The strip 76 showing a printed word task designation 74 such as "Practice Lesson" and "Read a Story" may be used by older literate children. This strip is used in a similar fashion and may be marked in a daily fashion as that just described.

The strips may be varied in different types of pictorial or worded representations as desired. The storage slots in each of the modules may be filled with identical strips or may be varied in the printed task designating indicia to present a wide range of tasks as will be readily understood.

The modules may also be varied in number through the simple connecting means. The tongue and groove connections provide an efficient and inexpensive means for rapidly connecting or removing the modules to change the capacity as desired.

While the invention has been primarily described for use with regard to recording for days of the week, other time periods such as hourly time periods, weekly, monthly and the like may be used as desired. Likewise, the character of the strips may be varied to provide for recording of prescriptions and dosages, a message recorder for notes, addresses and telephone numbers and the like.

Various changes and modifications may be made in the invention as will be readily apparent to those skilled in the art. Such changes and modifications are within the scope and teaching of this invention as defined by the claims appended hereto.

What is claimed is:

1. An educational task recording device comprising a housing having a front side provided with at least one row of spaced horizontally aligned separate openings, an opening in a side of said housing in vertical registry with said row of openings, said openings receiving a slidable strip member movable from outside of said housing into registry with said openings, said housing having marking indicia corresponding to a period of time such as a plurality of days of the week located adjacent to a plurality of said separate openings and a task designation opening at an end of said row of openings, said strip having a task designating indicia registrable with said task designation opening and said strip being markable in the areas framed by said period of time openings for indicating the performance of the task.

2. The recording device of claim 1 in which the strip is slidably received within said side opening of the housing and means are provided in said housing for supporting said strip member thereon in exposable relation to the row of openings in the housing.

3. The recording device of claim 2 in which the means for supporting the strip member comprises a slot-like opening extending from an end of said housing behind a front wall of said housing to a length at least equal to the length of the row of openings in the housing.

4. The recording device of claim 2 in which storage means are provided for a plurality of said strip-like members, said storage means being comprised of a wide slot-like opening extending from an end of said housing to a length at least equal to the length of the row of openings in the housing.

5. The recording device of claim 4 in which the means for supporting the strip member in the housing comprises a slot-like opening extending from an end of said housing behind a front wall of said housing to a length at least equal to the length of the row of openings in the housing and in front of said storage means.

6. The recording device of claim 1 in which a moveable pointer member is located in registry with the days of the week marking indicia to indicate the day of the week.

7. The recording device of claim 1 in which a plurality of rows of aligned spaced openings are provided in said housing for separately recording a plurality of separate tasks, said rows being in registered vertical alignment.

8. The recording device of claim 7 in which said housing is comprised of separate modules, each of said modules containing a separate row of said openings.

9. The recording device of claim 8 in which said modules are removably connected together by tongue and groove connecting means.

10. The recording device of claim 1 in which said row of openings has a summation opening at an end of said row of openings in the housing opposed to said task designation opening and said strip has a summation designating indicia registrable with said summation opening.

11. The recording device of claim 5 in which a plurality of rows of aligned openings are provided in said housing for separately recording a plurality of separate tasks, said rows being in registered vertical alignment and said housing is comprised of separate modules, each of said modules containing a separate row of said openings.

12. The recording device of claim 8 in which each module has means for supporting the strip member comprising a slot-like opening extending from an end of said housing behind a front wall of said housing to a length at least equal to the length of the row of openings in the housing and storage means provided for a plurality of said strip-like members, said storage means being comprised of a wide slot-like opening extending from an end of said housing to a length at least equal to the length of the row of openings in the housing.

13. The recording device of claim 1 in which the task designating indicia is a pictorial representation of the task to be performed.

14. The recording device of claim 1 in which the task designating indicia is a worded designation of the task to be performed.

15. The recording device of claim 2 in which the strip is comprised of a stiff material having a remarkable surface when registered with said period of time openings and has a length sufficient to extend outside the housing when fully received therein for ready grasping by the user.

* * * * *